United States Patent [19]
York et al.

[11] 3,843,774
[45] Oct. 22, 1974

[54] PREPARATION OF NON-SOLVATED ALUMINUM HYDRIDE
[75] Inventors: Buddy L. York, Akron, Mich.;
Kazuji Terada, Boulder, Colo.
[73] Assignee: The Dow Chemical Company, Midland, Mich.
[22] Filed: Nov. 15, 1965
[21] Appl. No.: 507,964

[52] U.S. Cl. .............................. 423/645, 260/448 R
[51] Int. Cl. ............................................. C01b 6/00
[58] Field of Search ....................... 23/204; 423/645

[56] References Cited
OTHER PUBLICATIONS

Emeleus et al., Advances in Inorganic Chemistry, Vol. 8, 1966, Academic Press, New York, Page 283 QD1A35.
Hoffman, Aluminum Hydride, LMSD–703150, August 1960, Pages 3–6 and 17–19.
Rice, Non-Solvated Aluminum Hydride, Dept. of Chemistry, Tufts University, Medford, Mass., 1956, Pages 1–6.

Primary Examiner—Leland A. Sebastian
Attorney, Agent, or Firm—C. Kenneth Bjork

EXEMPLARY CLAIM

1. A process for preparing crystalline, substantially non-solvated aluminum hydride which comprises,
   a. dissolving aluminum chloride in diethyl ether and recovering aluminum chloride monodiethyl etherate from the resulting ethereal solution,
   b. reacting said aluminum chloride-monodiethyl etherate with a light metal hydride thereby preparing an aluminum hydride-aluminum chloride-diethyl ether complex,
   c. reacting said aluminum hydride-aluminum chloride-diethyl ether complex in the liquid state with lithium aluminum hydride thereby to prepare an ethereal product solution containing aluminum hydride-diethyl ether solvate,
   d. separating said product solution from co-produced solid by-products, and
   e. recovering a solid, crystalline, substantially non-solvated aluminum hydride from said ethereal product solution.

2 Claims, No Drawings

PREPARATION OF NON-SOLVATED ALUMINUM HYDRIDE

This invention relates to light metal hydrides and more particularly is concerned with an improved process for preparing substantially non-solvated, crystalline aluminum hydride and to a novel reactant material used in the process.

Heretofore, crystalline, substantially non-solvated aluminum hydride has been prepared by reacting lithium aluminum hydride directly with aluminum chloride in a large volume of a dialkyl ether diluent, e.g., diethyl ether, in an inert substantially anhydrous atmosphere. The corresponding ether solvated aluminum hydride is recovered from the ethereal reaction mixture. This solid product is heat treated under specific and predetermined reaction conditions to provide crystalline, non-solvated aluminum hydride.

One difficulty accompanying the preparation of crystalline, substantially non-solvated aluminum hydride as prepared heretofore is that the aluminum chloride employed as a reactant as commercially prepared contains impurities which cannot entirely be removed even by sublimation and which can be carried over into the resulting non-solvated, crystalline aluminum hydride product. Additionally, relatively expensive lithium aluminum hydride ordinarily is employed as the sole source of hydrogen in the methods ordinarily employed.

It is a principal object of the present invention to provide an improvement in the process for preparing crystalline, substantially non-solvated aluminum hydride using novel reactant materials in integrated process steps whereby difficulties accompanying the usual method of preparing such aluminum hydride are substantially overcome or minimized to a large extent.

In accordance with the improvement of the present process, aluminum chloride is dissolved in diethyl ether and a high purity aluminum chloride diethyl etherate $[(AlCl_3 \cdot (C_2H_5)_2O]$ recovered therefrom. The aluminum chloride diethyl etherate is reacted with a light metal hydride, i.e., either a complex light metal hydride or binary light metal hydride, to provide an aluminum chloride·aluminum hydride·diethyl ether complex of fixed composition. This complex in turn is reacted with lithium aluminum hydride to provide a solvated aluminum hydride. At a minimum, lithium aluminum hydride slightly in excess of that required stoichiometrically for reaction to produce aluminum hydride ordinarily is employed. The resulting solvated aluminum hydride product subsequently is desolvated to provide any of several predetermined crystalline forms of non-solvated aluminum hydride. Conveniently, the non-solvated crystalline aluminum hydride is prepared from the ether solvated aluminum hydride by following the procedural steps and techniques disclosed in U.S. Pat. application Ser. No. 179,510, filed Mar. 8, 1962.

Ordinarily in the practice of the present invention, aluminum chloride in excess of that required to provide the aluminum chloride monodiethyl etherate corresponding to the formula $[(AlCl_3(C_2H_5)_2O]$ is dissolved in diethyl ether. Excess ether is removed from the product solution and the resulting aluminum chloride etherate distilled under reduced pressure. The resulting high purity aluminum chloride monodiethyl etherate distills at about 100° C. and 0.5 millimeter mercury pressure as a transparent colorless liquid. It condenses to a white product which is solid at room temperature and which melts at about 35° C. Even though relatively impure aluminum chloride is employed as a starting material, this etherate product exhibits a low impurity level substantially undetectable even by sensitive analytical techniques.

To prepare the novel aluminum hydride-aluminum chloride-diethyl ether complex, the aluminum chloride monodiethyl etherate in the liquid state is mixed with a light metal hydride while maintaining the reaction mix within a temperature of from about 35° C. to about 90° C. and a maximum pressure of about 1 atmosphere. The relative proportions of light metal hydride to aluminum chloride monodiethyl etherate to be used are not critical. However, to assure substantially complete conversion of the aluminum chloride monodiethyl etherate to a complex aluminum hydride·aluminum chloride·diethyl ether complex of fixed composition corresponding to the formula $AlH_3 \cdot 3AlCl_3 \cdot 4(C_2H_5)_2O$, an excess of the light metal hydride reactant of that required to react with at least one-fourth of the aluminum chloride values present in the aluminum chloride monodiethyl etherate ordinarily is employed.

Light metal hydride sources particularly suitable for use in preparing the aluminum chloride·aluminum hydride·diethyl ether complex of the present invention can be selected from a wide variety of relatively inexpensive alkali- and alkaline earth metal hydride materials such as, for example, sodium hydride (NaH), sodium aluminum hydride ($NaAlH_4$), calcium hydride ($CaH_2$) and magnesium hydride ($MgH_2$) which have not found use heretofore in the preparation of aluminum hydride. Alternatively, other light metal hydrides, for example lithium hydride (LiH), potassium hdyride (KH) and complex light metal hydrides such as sodium borohydride ($NaBH_4$), lithium aluminum hydride ($LiAlH_4$), lithium borohydride ($LiBH_4$), etc., for example, can be used in preparing the aluminum hydride·aluminum chloride·diethyl ether complex.

To prepare aluminum hydride, the resulting aluminum hydride·aluminum chloride·diethyl ether complex after separation for reaction by-products can be reacted directly with lithium aluminum hydride at a temperature of from about minus 20° C. to about 50° C. or more. Alternatively, if desired additional quantities of diethyl ether diluent can be added to the reaction mixture. Ordinarily the complex is added to lithium aluminum hydride at about room temperature over a period of time of from about 10 minutes to about 1 hour or more, usually over about 30 minutes. The resulting reaction mass is agitated both during the mixing operation and the stirring continued for an additional period of from about 10 minutes to an hour or more, ordinarily about 30 minutes after completion of the mixing of the reactants. Following this reaction period, solid by-products are separated from the resulting ethereal aluminum hydride etherate product solution. This product solution then is heated, ordinarily in accordance with reaction conditions set forth in application Ser. No. 179,510, thereby to prepare and recover crystalline, substantially non-solvated aluminum hydride.

For the optimum in product purity and highest yields all material and product handling, storage and manipulative operations of the present process are carried out in an inert atmosphere under substantially anhydrous conditions. Dry nitrogen or dry argon are particularly suitable.

The following examples will serve further to illustrate the present invention but are not meant to limit it thereto.

EXAMPLE I

Preparation of Aluminum Chloride Monodiethyl Etherate [$AlCl_3 \cdot (C_2H_5)_2O$]

About 175 grams of a commercial grade powdered aluminum chloride was added with agitation to about 500 cubic centimeters of diethyl ether at about minus 80° C. under a substantially anhydrous nitrogen atmosphere. (The aluminum chloride reactant upon emission spectroscopy analysis exhibited the following concentration of impurities, all values being in weight percent: Ca < 0.025, Cu—0.0077, Fe—0.013, Mg—0.25, Mn—0.0046, Pb < 0.0050, Si—0.026 and Zn—0.072.)

Following completion of the mixing operation the temperature of the resulting solution was raised to about 50° C. and excess ether flashed off under a reduced pressure.

The resulting product mass was distilled at a temperature of about 100° C. and an absolute pressure of about 0.5 millimeter mercury. The colorless, transparent distillate condensed into a white product having a melting point of about 35° C. Elemental analysis of the solidified product for carbon, hydrogen, aluminum, chlorine and oxygen showed on a weight basis C—23.0 percent, H—4.99 percent, Al—13.12 percent, Cl—51.35 percent, O—7.66 percent (oxygen was calculated, based on carbon). Theoretical elemental analysis for aluminum chloride-monodiethyl etherate [$AlCl_3 \cdot (C_2H_5)_2O$] is C—23.16 percent, H—4.86 percent, Al—13.00 percent, Cl—51.30 percent and O—7.68 percent.

The absorption spectrum obtained from infrared spectroscopy analysis supported the structure and demonstrate absorptions indicating a bonded ether molecule.

Emission spectroscopy analysis of the aluminum chloride-monodiethyl etherate showed the following impurity concentrations expressed in weight percent: Ca < 0.025, Cu < 0.0025, Fe < 0.0010, Mg—0.0006, Mn < 0.0005, Pb < 0.0050, Si—0.0033 and Zn < 0.010. The impurity levels shown as being "less than" (<) the corresponding percent are below the sensitivity level of the test procedure and equipment.

The aluminum chloride-monodiethyl etherate dissolved endothermically in ether forming a colorless solution. It was soluble in benzene and toluene. The compound itself acted as a solvent for etherated aluminum hydride and certain crystalline forms of non-solvated aluminum hydride.

EXAMPLE 2

Preparation of Aluminum Hydride·Trialuminum Chloride·Tetradiethyl Ether Complex [$AlH_3 \cdot 3AlCl_3 \cdot 4(C_2H_5)_2O$]

About 20 grams of aluminum chloride-monodiethyl etherate prepared as set forth in Example 1 were heated to about 65°–70° C. Two grams of aluminum chloride powder were stirred into solution in the molten etherate. About 1 gram of sodium hydride slowly was added to the agitated reaction mass over a period of from about 15 to about 20 minutes. The resulting mixture was stirred for about an hour while maintaining the temperature at the indicated range. Following the reaction period, residual solids were separated from the liquid phase.

The product liquid was distilled at about 65° C. and 0.5 millimeter mercury absolute, the distillate at room temperature being a clear, colorless, transparent liquid.

All procedural steps and material handling, storage and the like operations were carried out under a substantially anhydrous nitrogen atmosphere.

Elemental analysis of the product showed on a weight basis C—25.51 percent, H—5.92 percent, Al—14.87 percent, Cl—44.30 percent and O—8.50 percent (oxygen was calculated and based on carbon analysis).

Theoretical analysis for the complex aluminum hydride-trialuminum chloride-tetradiethyl ether, corresponding to the formula $AlH_3 \cdot 3AlCl_3 \cdot 4(C_2H_5)_2O$ is C—26.4 percent, H—5.93 percent, Al—14.90 percent, Cl—44.0 percent and O—8.8 percent.

Infrared absorption spectrum of this compound showed characteristic absorption peaks at 6.8, 6.9, 7.2, 7.55, 7.8, 7.95, 8.4, 8.7, 9.15, 10.05, 11.4, 11.95, 12.55 and 13.05 microns. These data are indicative of diethyl ether and Al—H absorption bands thereby being in full support of the structure.

Nuclear Magnetic Resonance (NMR) data also are in support of the assigned structure.

The alumimum hydride-trialuminum chloride-tetradiethyl ether complex exhibited a good shelf life and was soluble in benzene and toluene.

X-ray diffraction analysis of the solid residue which had been separated from the liquid $AlH_3 \cdot 3AlCl_3 \cdot 4(C_2H_5)_2O$ product showed this material to be substantially 60–70 percent sodium hydride and 30–40 percent sodium chloride.

In a second preparation, following the general technique set forth directly hereinbefore about 2 grams of sodium aluminum hydride ($NaAlH_4$) were added to about 20 grams of aluminum chloride-monodiethyl etherate and the resulting mixture stirred while being heated at about 65° C. for a reaction period of about 10 minutes. After this time, the residual solids were separated by filtration from the liquid phase and both liquid product and by-product solid phases were analyzed.

The liquid phase was purified by distillation, the product boiling at about 65° and an absolute pressure of 0.5 millimeter mercury. Elemental infrared and NMR analysis of the clear, colorless liquid product all were the same as for the product of the preceding preparation and showed this material to be $AlH_3 \cdot 3AlCl_3 \cdot 4(C_2H_5)_2O$.

X-ray diffraction anaylsis of the solid residue separated from the reaction mass showed this to be primarily sodium chloride having about 5–10 percent sodium aluminum hydride associated therewith.

By following the same procedure set forth in this example, sodium hydride, sodium aluminum hydride, magnesium hydride, lithium hydride, calcium hydride, lithium aluminum hydride and the like can be reacted with aluminum chloride-monodiethyl etherate at a temperature of from about 35° C. to about 90° C. at a maximum pressure of about 1 atmosphere to prepare the novel complex compound corresponding to the formula $AlH_3 \cdot 3AlCl_3 \cdot 4(C_2H_5)_2O$.

It is unexpected that metal hydride sources such as sodium hydride, or sodium aluminum hydride, for example, could be used to generate a compound containing aluminum hydride by reaction with an aluminum chloride source material.

EXAMPLE 3

Preparation of Crystalline, Non-Solvated Aluminum Hydride From $AlH_3 \cdot 3AlCl_3 \cdot 4(C_2H_5)_2O$ About 0.038 gram mole ($\approx 1.43$ grams) of lithium aluminum hydride ($LiAlH_4$) dissolved in about 50 cubic centimeters of diethyl ether was added to a slurry of about 0.12 gram mole ($\approx 6.5$ grams) of sodium aluminum hydride ($NaAlH_4$) in about 150 cubic centimeters of diethyl ether. About 8.9 grams of $AlH_3 \cdot 3AlCl_3 \cdot 4(C_2H_5)_2O$ complex dissolved in about 50 cubic centimeters of diethyl ether was added slowly with stirring to the first mixture over a period of about 30 minutes. All procedural steps were carried out at about room temperature and under a substantially anhydrous nitrogen atmosphere. The resulting reaction mixture was agitated for an additional 30 minutes after the mixing was complete. Following this period, the product solution was filtered into about 1,700 cubic centimeters of substantially anhydrous benzene. About 50 milliliters of a 0.7 molar solution of lithium borohydride ($LiBH_4$) in diethyl ether were added to this solution.

The reaction vessel containing the ether-benzene product solution was placed in an oil bath maintained at about 95° C. and the ether stripped therefrom until the temperature rose to about 75° C. At this point, in accordance to the practice set forth in U.S. Pat. application Ser. No. 179,510, the system was put on total reflux.

With the conventionally employed aluminum chloride and lithium aluminum hydride reactants, at this reflux temperature a non-solvated aluminum hydride ordinarily starts to precipitate almost immediately in the reaction medium. This aluminum hydride, designated as alpha-aluminum hydride, has a hexagonal crystal structure, a unique X-ray diffraction pattern, unit cell dimensions of about $a = 4.44 \pm 0.02 \text{Å}$ and $c = 5.89 \pm 0.02 \text{Å}$ and a density of greater than 1.4 grams per cubic centimeter.

In the present preparation, using the complex aluminum hydride-trialuminum chloride-tetradiethyl etherate as reactant, the solution remained clear with no precipitation even after four hours reflux.

Stripping of ether from the liquid mass was resumed. As the mix temperature reached 79° C., precipitation started to occur. At this point, reflux of the reaction mass was again started and continued for about 1 hour during which time precipitation of a white crystalline product continued in the refluxing mass. Characterization of the crystalline product after recovery from the reaction mixture showed this to be alpha-aluminum hydride. Product purity and yield were comparable to that obtained by the procedure for alpha-aluminum hydride preparation employing aluminum chloride and lithium aluminum hydride as reactants.

In other runs carried out using the same reactants and techniques described directly hereinbefore, crystalline, non-solvated aluminum hydride was precipitated from the reaction solution at temperatures of from about 75° C. to about 79° C.

In a second preparation, about 6.4 grams of the $AlH_3 \cdot 3AlCl_3 \cdot 4(C_2H_5)_2O$ complex was mixed with 1 gram of powdered lithium aluminum hydride and the resulting mixture refluxed under an absolute pressure of about 1 micron mercury at about 70° C. for about 2 hours. The resulting solids, which precipitated in the reaction mass during this period, were separated by filtration and recovered. The solid product was washed with diethyl ether and analyzed by X-ray diffraction. This analysis indicated the solid product was substantially 75 percent lithium chloride and about 25 percent of a relatively low density, crystalline non-solvated aluminum hydride having an X-ray diffraction pattern the same as that for the aluminum hydride designated in U.S. Pat. application Ser. No. 179,510 as gamma-aluminum hydride.

Conversion of the gamma-aluminum hydride to alpha-aluminum hydride, if desired, readily can be attained by the process set forth in application Ser. No. 179,510.

From the results of these studies, it can be seen that crystalline, non-solvated aluminum hydride unexpectedly can be prepared using the novel aluminum hydride-aluminum chloride-diethyl ether complex disclosed in the present application as a unique source of aluminum reactant source material. Additionally, this reactant in itself provides a part of the total aluminum hydride product. The aluminum hydride contained in this reactant is unique in that it arises from use of light metal hydrides which have not been found to be suitable for use in other processes for preparing crystalline, non-solvated aluminum hydride.

Various modifications can be made in the present invention without departing from the spirit or scope thereof for it is understood that we limit ourselves only as defined in the appended claims.

We claim:

1. A process for preparing crystalline, substantially non-solvated aluminum hydride which comprises,
   a. dissolving aluminum chloride in diethyl ether and recovering aluminum chloride-monodiethyl etherate from the resulting ethereal solution,
   b. reacting said aluminum chloride-monodiethyl etherate with a light metal hydride thereby preparing an aluminum hydride-aluminum chloride-diethyl ether complex,
   c. reacting said aluminum hydride-aluminum chloride-diethyl ether complex in the liquid state with lithium aluminum hydride thereby to prepare an ethereal product solution containing aluminum hydride-diethyl ether solvate,
   d. separating said product solution from co-produced solid by-products, and
   e. recovering a solid, crystalline, substantially non-solvated aluminum hydride from said ethereal product solution.

2. The process as defined in claim 1 and including the steps of dissolving said aluminum chloride in an excess of diethyl ether over that required for preparation of said aluminum chloride-monodiethyl etherate, removing excess ether from the aluminum chloride-monodiethyl etherate product and distilling said product thereby to prepare a high purity aluminum chloride-monodiethyl etherate, reacting said aluminum chloride-monodiethyl etherate while in the liquid state with a light metal hydride selected from the group consisting of sodium hydride or sodium aluminum hydride while maintaining the temperature within a range of from about 35° C. to about 90° C. and a maximum pressure of about 1 atmosphere, the amount of said light metal at a minimum providing sufficient hydrogen to react with at least one-fourth of the aluminum chloride values present thereby to prepare aluminum hydride·trialuminum chloride·tetradiethyl ether complex, adding said complex to lithium aluminum hydride with agitation over a period of from about 10 minutes to about 1 hour and continuing said agitation for a period of from about 10 minutes to about 1 hour after completion of the mixing of said complex and said lithium aluminum hydride.

* * * * *